United States Patent
Canpolat et al.

(10) Patent No.: US 9,204,383 B2
(45) Date of Patent: Dec. 1, 2015

(54) TECHNIQUES FOR SELECTING AN ACCESS POINT FOR WIRELESS NETWORK DISCOVERY

(71) Applicant: Intel Corporation, Santa Clara, CA (US)

(72) Inventors: Necati Canpolat, Beaverton, OR (US); Vivek Gupta, Milpitas, CA (US)

(73) Assignee: INTEL CORPORATION, Santa Clara, CA (US)

( * ) Notice: Subject to any disclaimer, the term of this patent is extended or adjusted under 35 U.S.C. 154(b) by 70 days.

(21) Appl. No.: 13/902,597

(22) Filed: May 24, 2013

(65) Prior Publication Data
US 2014/0269654 A1    Sep. 18, 2014

Related U.S. Application Data

(60) Provisional application No. 61/786,964, filed on Mar. 15, 2013.

(51) Int. Cl.
| | | |
|---|---|---|
| H04W 48/20 | (2009.01) | |
| H04W 48/16 | (2009.01) | |
| H04W 48/18 | (2009.01) | |
| H04L 29/08 | (2006.01) | |

(52) U.S. Cl.
CPC .............. *H04W 48/20* (2013.01); *H04L 67/16* (2013.01); *H04W 48/16* (2013.01); *H04W 48/18* (2013.01)

(58) Field of Classification Search
None
See application file for complete search history.

(56) References Cited

U.S. PATENT DOCUMENTS

| | | |
|---|---|---|
| 2008/0151796 A1 | 6/2008 | Jokela |
| 2009/0046657 A1 | 2/2009 | Kim et al. |
| 2011/0286405 A1 | 11/2011 | Kim et al. |
| 2012/0020296 A1* | 1/2012 | Scherzer et al. ............. 370/328 |
| 2012/0076118 A1 | 3/2012 | Montemurro et al. |
| 2012/0165056 A1* | 6/2012 | Kim et al. ..................... 455/509 |
| 2012/0243524 A1 | 9/2012 | Verma et al. |
| 2012/0281609 A1* | 11/2012 | Kasslin et al. ................ 370/312 |
| 2012/0300759 A1 | 11/2012 | Patanapongpibul et al. |
| 2012/0324100 A1 | 12/2012 | Tomici et al. |
| 2013/0070644 A1* | 3/2013 | McCann et al. .............. 370/255 |

(Continued)

FOREIGN PATENT DOCUMENTS

KR    WO2012077991 A2 *  6/2012

OTHER PUBLICATIONS

"Wi-Fi Alliance® Technical Committee Hotspot 2.0 Technical Task Group Hotspot 2.0 (Release 2) Technical Specification Version 2.13", Feb. 5, 2013 Wi-Fi Alliance, 168 pages, author unknown.
"Draft STANDARD for Information Technology-Telecommunications and information exchange between systems—Local and metropolitan area networks—Specific requirements", IEEE P802.11u/D13.0, Nov. 2010, 218 pages, author unknown.
International Search Report and Written Opinion received for PCT Patent Application No. PCT/US2014/020080, mailed Jun. 30, 2014, 10 pages.

(Continued)

*Primary Examiner* — Faruk Hamza
*Assistant Examiner* — Cassandra Decker
(74) *Attorney, Agent, or Firm* — Kacvinsky Daisak Bluni PLLC

(57) ABSTRACT

Examples are disclosed for selecting an access point for network discovery by a mobile device. In some examples, a mobile device may scan access points belonging to one or more extended service sets (ESSs) belonging to one or more networks. The one or more networks may have advertisement servers capable of providing a generic advertising service (GAS) to the mobile device. The mobile device may select a single access point from among each of the ESSs to relay messages to advertisement servers of the one or more networks for the advertisement servers to provide the GAS to the mobile device. Other examples are described and claimed.

17 Claims, 10 Drawing Sheets

(56) References Cited

U.S. PATENT DOCUMENTS

2013/0242783 A1* 9/2013 Horn et al. .................... 370/252
2013/0267237 A1* 10/2013 Kim et al. ..................... 455/450
2013/0316705 A1* 11/2013 Kneckt et al. ............. 455/435.1
2014/0016612 A1* 1/2014 Montemurro et al. ........ 370/331
2014/0269654 A1 9/2014 Canpolat et al.
2015/0131641 A1* 5/2015 Ong et al. .................... 370/338

OTHER PUBLICATIONS

Search Report and Office Action received for Taiwanese Patent Application No. 103107483, mailed Jun. 26, 2015, 9 pages including 1 page English translation.

* cited by examiner

Beacon or Probe Response Format 200

| BSSID 210 | HESSID 220 | PAME-BI 230 |
|---|---|---|

SCAN FOR APs BELONGING TO ONE OR MORE ESSs SEPARATELY BELONGING TO ONE OR MORE NETWORKS SEPARATELY HAVING ONE OR MORE ADVERTISEMENT SERVERS FOR SEPARATELY PROVIDING A GAS SERVICE TO A MOBILE DEVICE
502

BUILD A LIST OF APs BELONGING TO A FIRST ESS FROM AMONG THE ONE OR MORE ESSs BASED ON THE SCAN, THE FIRST ESS BELONGING TO A FIRST NETWORK HAVING A FIRST ADVERTISEMENT SERVER
504

SELECT AN AP FROM THE LIST TO USE THE FIRST AP TO RELAY GAS MESSAGES ASSOCIATED WITH THE GAS PROVIDED BY FIRST ADVERTISEMENT SERVER TO THE MOBILE DEVICE
506

SEND ONE OR MORE GAS REQUEST MESSAGES TO THE FIRST AP AND RECEIVE ONE OR MORE GAS RESPONSE MESSAGES FROM THE FIRST AP
508

DETERMINE WHETHER TO CONNECT TO THE FIRST NETWORK BASED ON INFORMATION INCLUDED IN THE ONE OR MORE GAS RESPONSE MESSAGES AND SEND AN ASSOCIATION REQUEST BASED ON THE DETERMINATION TO AN AP FROM THE LIST OF APs BELONGING TO THE FIRST ESS, THE ASSOCIATION REQUEST TO INITIATE CONNECTION TO THE FIRST NETWORK THROUGH THE AP
510

*FIG. 5*

Storage Medium 600

*Computer Executable Instructions for 500*

```
RECEIVE PROBE REQUEST MESSAGE RELATED TO A SCAN BY
A MOBILE DEVICE SEEKING APs FOR A NETWORK, THE AP
BELONGING TO AN ESS FOR THE NETWORK, THE NETWORK
HAVING AN ADVERTISEMENT SERVER FOR PROVIDING A GAS
TO THE MOBILE DEVICE
802
```

```
GENERATE A BEACON OR PROBE RESPONSE MESSAGE THAT
INCLUDES AN IDENTIFIER FOR THE AP, AN IDENTIFIER FOR
THE ESS, AND AN INDICATION OF WHETHER THE
ADVERTISEMENT SERVER WILL PROVIDE A RESPONSE TO A
GAS REQUEST MESSAGE FROM THE MOBILE DEVICE THAT IS
INDEPENDENT OF WHAT AP INCLUDED IN THE ESS THE
MOBILE DEVICE SELECTS TO USE TO RELAY MESSAGES TO
THE ADVERTISEMENT SERVER
804
```

```
CAUSE THE BEACON OR PROBE RESPONSE TO BE SENT TO
THE MOBILE DEVICE
806
```

```
RELAY GAS RELATED MESSAGES BETWEEN THE MOBILE
DEVICE AND THE ADVERTISEMENT SERVER
808
```

*FIG. 8*

Storage Medium 900

Computer Executable
Instructions for 800

TECHNIQUES FOR SELECTING AN ACCESS POINT FOR WIRELESS NETWORK DISCOVERY

RELATED CASE

This application claims priority to U.S. Provisional Patent Application No. 61/786,964, filed on Mar. 15, 2013.

TECHNICAL FIELD

Examples described herein are generally related to a mobile device discovering a wireless network.

BACKGROUND

In recent years broadband wireless networks to include both wireless wide area networks (WWANs) or wireless local area networks (WLANs) have seen an explosion in the amount of data traffic associated with mobile devices or user equipment (UEs) accessing these networks. Cellular-based WWANs associated with one or more third generation (3G) or fourth generation (4G) wireless standards promulgated by organizations or standards bodies such as the $3^{rd}$ Generation Partnership Project (3GPP) have become common. Also, UEs coupling to either 3G 3GPP and/or 4G 3GPP wireless networks often have a dual mode capability to not only couple to a cellular-based WWAN but may also to a WLAN using wireless technologies such as Wi-Fi™.

Wi-Fi infrastructure and agreements between service providers for WWANs and/or WLAN are expanding to accommodate roaming of mobile devices. Mobile device roaming may occur not only between WWANs operated by different service providers but also between WWANs and WLANs operated by different service providers or even WLANs operated by different service providers. Industry organizations such as the Wi-Fi Alliance® have developed industry standards and/or technical specifications to facilitate discovery of wireless networks, roaming of mobile devices and use of Wi-Fi infrastructure.

BRIEF DESCRIPTION OF THE DRAWINGS

FIG. 2 illustrates an example beacon or probe response format.
FIG. 5 illustrates an example of a first logic flow.
FIG. 6 illustrates an example of a first storage medium.
FIG. 8 illustrates an example of a second logic flow.
FIG. 9 illustrates an example of a second storage medium.

DETAILED DESCRIPTION

Figure 1:
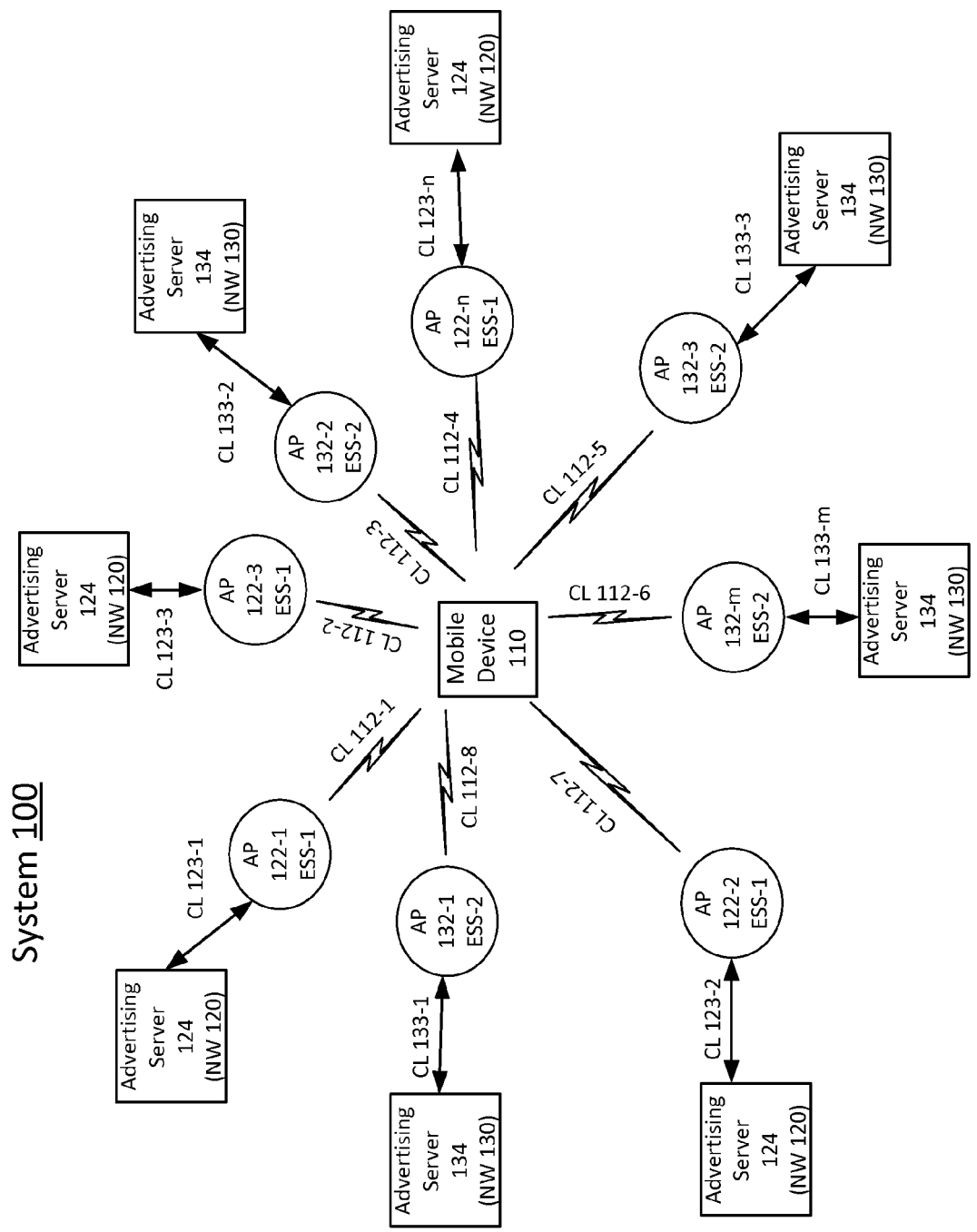
FIG. 1 illustrates an example of a system.

Examples are generally directed to improvements for network discovery by mobile devices or user equipment (UE) of wireless local area networks (WLANs) operated as Wi-Fi hotspots. These wireless technologies may include technologies suitable for use with mobile devices or UEs capable of coupling to Wi-Fi access networks potentially operated by different service providers. As contemplated by this disclosure, industry organizations such as the Wi-Fi Alliance have developed industry standards and/or specifications to facilitate network discover and selection of Wi-Fi hotspots. Standard for operating the WLANs may include standards promulgated by the Institute of Electrical Engineers (IEEE). These WLAN standards may include Ethernet wireless standards (including progenies and variants) associated with the IEEE 802.11-2012 Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11"). Also standards associated with network discover of WLAN networks may include such IEEE 802.11 standards as IEEE 802.11u™-2011, Amendment 9: Interworking with External Networks, published February 2011, and/or later version of this standard ("IEEE 802.11u"). Also specifications published by the Wi-Fi Alliance such as the Hotspot 2.0 (Release 1) Technical Specification, version 1.0.0, published June 2012, and/or later versions of this specification ("WFA Hotspot 2.0") may also be associated with mobile devices or UEs roaming between WLANs or between a WAN and a WLAN.

The different service providers may also implement wireless mobile broadband technologies that may include any wireless technologies suitable for use with mobile devices or UEs, such as one or more 3G or 4G wireless standards, revisions, progeny and variants. Examples of wireless mobile broadband technologies may include without limitation any of the Institute of Electrical and Electronics Engineers (IEEE) 802.16m and 802.16p standards, 3GPP Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP before Release 8 ("3G 3GPP") or Release 8 and above ("4G 3GPP") of LTE/System Architecture Evolution (SAE), and so forth. The examples are not limited in this context.

WFA Hotspot 2.0 introduces a methodology for a UE or mobile device to perform network discovery and network selection when attempting to connect to a network via a Wi-Fi hotspot. This methodology involves use of an IEEE 802.11u generic advertisement service (GAS) or similar protocols that can be used in pre-associated service discover to gather information regarding networks that may be available to a mobile device via the Wi-Fi hotspot. The methodology described by WFA Hotspot 2.0 directs the mobile device to send GAS requests to all access points (AP) at the Wi-Fi hotspot possibly detected by the mobile device. Each AP may then separately route messages associated with the GAS requests to an advertisement server for a network which may also be called an access network query protocol (ANQP) server. Responsive to these messages, the advertisement server may then provide information about the network for the mobile device to determine whether to connect to the network.

In some examples, groups of APs may belong to with the same extended service sets (ESSs). For these examples, each ESS may have one or more advertisement servers. Using the methodology currently described by Hotspot 2.0, a mobile device would send GAS requests to all APs in a given ESS even though separate messages related to the GAS requests may all go to the same advertisement server (ANQP Server). In some large Wi-Fi hotspots (e.g., an airport terminal or a stadium), possibly hundreds of APs to the same ESSs may exist. In these large Wi-Fi hotspots, numerous mobile devices separately sending GAS requests to all APs would not only flood the airwaves with a large number of redundant requests but would also strain the advertisement servers in responding to the large number of redundant messages forwarded by many of the APs. Both the flooding of the airwaves and strain on the advertisement servers may substantially delay a mobile device's ability to discovery networks and to select a given network. It is with respect to these and other challenges that the examples described herein are needed.

According to some examples, a method may be implemented at a mobile device that includes scanning for APs belonging to one or more ESSs separately belonging to one or more networks. For these examples, the one or more networks may separately have one or more advertisement servers. Also, the one or more advertisement servers may be capable of separately providing a service such as GAS to the mobile device. A list may then be built that includes APs belonging to a first ESS from among the one or more ESSs. The list may have been built based on the scan. The first ESS may belong to a first network having a first advertisement server. A selection of a first AP from the list may then be made to use the first AP to relay messages related to the GAS provided by the first advertisement server to the mobile device. In some examples, use of just the first AP may reduce the number of GAS requests and related messages relayed between the mobile device and the first advertisement server.

FIG. 1 illustrates an example system 100. In some examples, as shown in FIG. 1, system 100 includes a mobile device 110 communicatively couple to a plurality of access points (APs) via wireless communication links (CLs) 112-1 to 122-8. For these examples the plurality of APs may belong to two different extended service sets (ESSs). For example ESS-1 may include APs 122-1 to 122-n, where n equals any positive whole integer greater than 3. Also, ESS-2 may include APs 132-1 to 132-m, where m equals any positive whole integer greater than 3. Also as shown in FIG. 1, the APs of ESS-1 may be communicatively coupled to advertisement server 124 of network (NW) 120 via CLs 123-1 to 123-n. Also, the APs of ESS-2 may be communicatively coupled to advertisement server 134 of NW 130 via CLs 133-1 to 133-m. This disclosure is not limited to a single mobile device or to two ESSs coupled to two networks. Any number of mobile devices or any number of ESSs belonging to any number of APs separately coupled to any number of networks is contemplated.

In some examples, mobile device 110, APs 122-1 to 122-n or 132-1 to 132-m may be arranged to operate according to the one or more wireless network technologies associated with IEEE 802.11 such as IEEE 802.11u and/or Hotspot 2.0. Although not shown in FIG. 1, mobile device 110 and APs 122-1 to 122-n or 132-1 to 132-m may each include logic and/or features (e.g., chipsets, processor circuits, memory, protocol stacks, etc.) to operate according to IEEE 802.11u and/or Hotspot 2.0 to transmit or receive communication signals via CLs 112-1 to 112-8. Also, advertisement servers 124 and 134 may also include logic and/or features to operate according to IEEE 802.11u and/or Hotspot 2.0 to transmit or receive communications signals via CLs 122-1 to 122-n and CLs 132-1 to 132-m, respectively with APs 122-1 to 122-n and 132-1 to 132-m, respectively.

According to some examples, ESS-1 and ESS-2 may each be homogeneous ESSs as described by IEEE 802.11u and/or Hotspot 2.0. For these examples, a first homogeneous ESS identifier (HESSID) may be used by APs 122-1 to 122-n to indicate their association with the homogeneous ESS of ESS-1. A second HESSID may be used by APs 132-1 to 132-m to indicate their association with the homogenous ESS of ESS-2. Also, APs 122-1 to 122-n and 132-1 to 132-m may each have their own basic service set identifications (BSSIDs) to uniquely identify a given APs to either mobile device 110 or to the advertisement servers for the networks their respective ESSs belong.

In some examples, NW 120 and NW 130 may be operated by one or more service providers of a wide area network. For these examples, mobile device 110 may be capable of connecting to NW 120 and/or NW 130 according to a preexisting subscriber agreement with the one or more service providers or an agreement between mobile device 110's home service provider and the one or more service providers. Alternatively a new subscriber agreement may be entered if mobile device 110 decides to connect NW 120 or NW 130.

According to some examples, an existing subscriber agreement may have been entered into by a user of mobile device 110 or provisioned into mobile device 110 by the service provider as part of a service contract. The service contract may be with a wireless carrier such as Boingo®, AT&T® or Verizon Wireless©. In other examples, the existing subscriber agreement may be a service contract with an internet service provider such as Comcast® Infinity®.

In some examples, as described more below, logic and/or features of mobile device 110 may select a given AP from among APs 122-1 to 122-n to relay messages related to advertisement server 124 providing a network advertising service such as GAS to mobile device 110. The logic and/or features may select a given AP from among APs 132-1 to 132-m to relay messages related to advertisement server 134 to also provide a network advertising service such as GAS to mobile device 110. For these examples, messages relayed to/from advertisement server 124 may provide network discovery information for mobile device 110 to decide whether it can and/or is capable of connecting to network 120. Meanwhile messages relayed to/from advertisement server 134 may provide network discovery information for mobile 110 to decide whether it can and/or is capable of connecting to network 130.

In some examples, advertisement server 124 for network 120 or advertisement server 134 for network 130 may either be located in close proximity of APs 122-1 to 122-n and 132-1 to 132-m such as in the same building, room or even co-located with one of the APs. In other examples advertisement server 124 or 134 may be located remotely to the APs 122-1 to 122-n and 132-1 to 132-m.

According to some examples, mobile device 110 may be a UE having wireless communication capabilities. The UE may include, but is not limited to, a computer, a personal computer (PC), a desktop computer, a laptop computer, a notebook computer, a netbook computer, a tablet computer, an ultra-book computer, a smart phone, a smart camera, embedded electronics, a gaming console, a portable media device, a portable gaming device, a work station, a mini-computer, a network appliance or a web appliance.

FIG. 2 illustrates an example beacon or probe response format 200. In some examples, a beacon or probe response sent from an AP may include at least the three fields of information shown in FIG. 2. For these examples, as shown in FIG. 2, beacon or probe response format 200 may include a BSSID field 210, a HESSID field 220 and a pre-association message exchange BSSID independent (PAME-BI) field 230. Although not shown in FIG. 2, beacon or probe response format 200 may be a portion of a beacon probe response frame or message generated by an AP operating in compliance with IEEE 802.11 and/or WFA Hotspot 2.0. The beacon or probe response frame having a portion in the example format of probe response format 200 may have been generated in response to a received probe request frame or message associated with a scan by a mobile device seeking APs for a network.

In some examples, BSSID field 210 may include identifier information for a given AP responding to the probe request message or sending a beacon. The HESSID field 220 may include an identifier for a given homogeneous ESS belonging to the AP responding to the probe request (if applicable) or sending the beacon. The PAME-BI field 230 may include an indication of whether an advertisement server will provide GAS related messages (e.g., query responses) to a mobile device that is independent of what AP or BSSID relayed or forwarded the GAS related messages to the advertisement server. For example, advertisement server 124 for network 120 may receive GAS related messages (e.g., query requests) relayed from any of APs 122-1 to 122-n belonging to ESS-1 and may then route GAS related messages (query responses) back to mobile device 110 in a manner that does not depend on which of APs 122-1 to 122-n was initially used. In other words, as long as the AP belongs to ESS-1, that AP may be used for relaying GAS related messages back to mobile device 110. Hence, for this example, the GAS related messages are sent back independent of the BSSID for APs involved in relaying these messages.

According to some examples, PAME-BI field 230 may include a bit. For these examples, if the PAME-BI field 230 bit is asserted that may indicate that GAS response or query messages are sent back independent of the BSSID. If the PAME-BI field 230 bit is not asserted, GAS response or query message are not independent of the BSSID. In some examples, as described more below, assertion of the bit in PAME-BI field 230 of a probe response in the example format of probe response format 200 may enable logic and/or features of a mobile device to select a single AP of a given ESS to use to relay messages related to the GAS provided by an advertisement server for a network to a mobile device. Selection of the single AP may be beneficial to faster network discovery times for the mobile device and also places a reduced burden on the advertisement server for the network.

Figure 3:
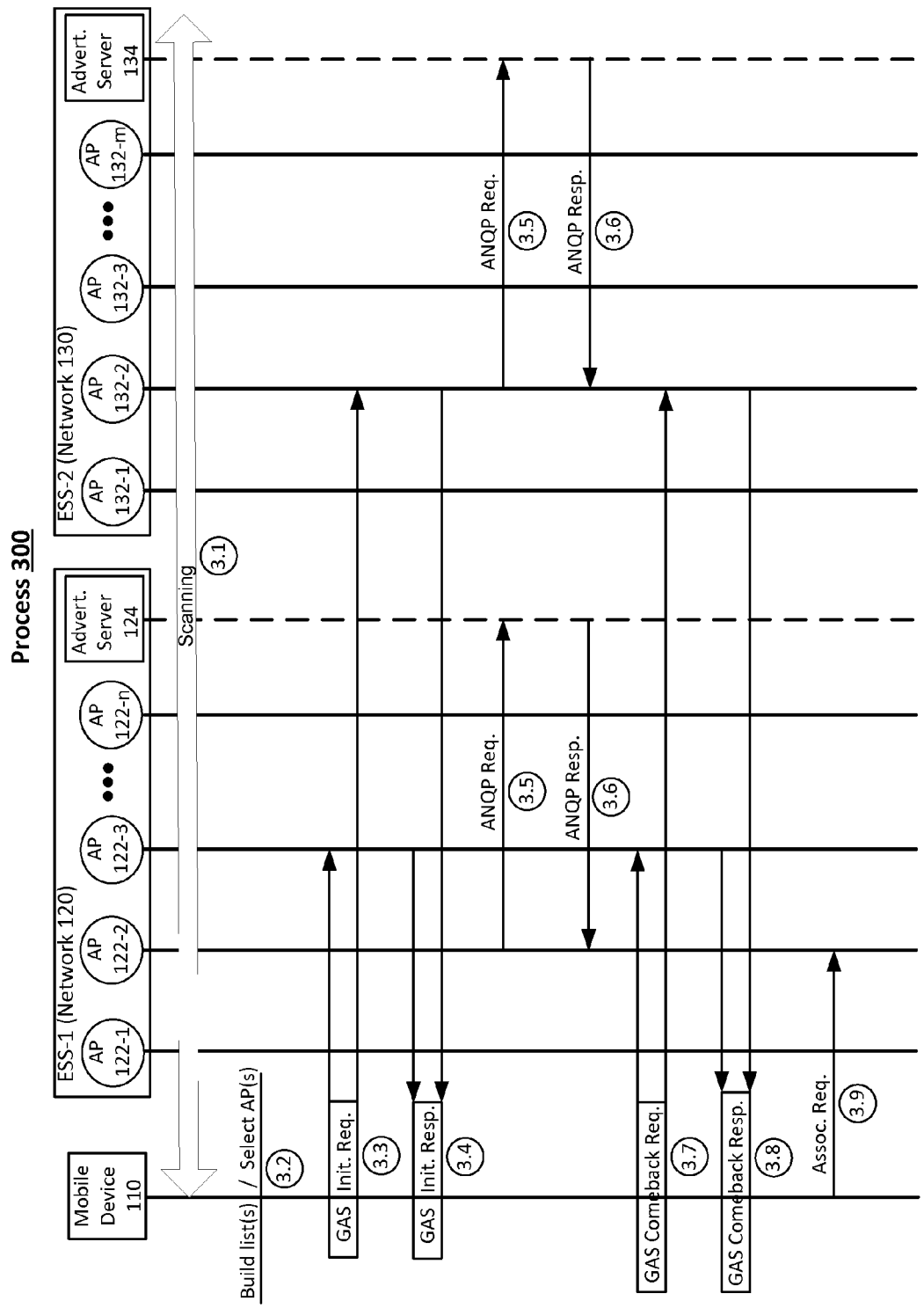
FIG. 3 illustrates an example process.

FIG. 3 illustrates an example process 300. In some examples, elements of system 100, as shown in FIG. 1 and the beacon or probe response format 200 as shown in FIG. 2 may be used to illustrate example operations related to the process flow 300 depicted in FIG. 3. The described example operations are not limited to implementations on system 100 or to the probe response format 200 shown in FIG. 2.

Beginning at process 3.1 (Scanning), mobile device 110 may include logic and/or features to scan for APs 122-1 to 122-n and APs 132-1 to 132-m. In some examples, the scan may include the logic and/or features causing one or more probe request messages to be sent from mobile device 110 to APs 122-1 to 122-n and/or APs 132-1 to 132-m. For these examples, at least some of the APs from ESS-1 and/or ESS-2 may send beacon or probe response messages in response to received probe request messages. The beacon or probe response messages may each include information described for beacon or probe response format 200 to include a BSSID, a HESSID and a PAME-BI indication (e.g., asserted bit) to indicate BSSID independence for GAS response messages or queries.

Proceeding to process 3.2 (Build list(s)/Select AP(s)), logic and/or features at mobile device 110 may be capable of building a first list of APs belonging to ESS-1 that sent beacon or probe response messages and a second list of APs belonging to ESS-2 that also sent beacon or probe response messages. The first and second lists, for example, may include information such as signal strength and/or signal quality of CLs with the responding APs, BSSIDs of the responding APs, HESSID for the ESS the responding AP belongs to and whether the PAME-BI bit was asserted in the beacon probe response in the example format of beacon or probe response format 200.

In some examples, the logic and/or features of mobile device 110 may determine that CL 112-2 with AP 122-3 has the strongest signal strength compared to CLs with the other APs of ESS-1. Also, the logic and/or features may determine that CL 112-3 with AP 132-2 has the strongest signal strength compared to CLs with the other APs of ESS-2. For these examples, the logic and/or features may then select AP 122-3 to relay GAS messages related to the GAS provided by advertisement server 124 to mobile device 110. The logic and/or features may also select AP 132-2 to relay GAS messages related to the GAS provided by advertisement server 134 to mobile device 110.

Proceeding to process 3.3 (GAS Init. Req.), logic and/or features at mobile device 110 may be capable of generating GAS initial requests and sending GAS initial request messages to selected APs 122-3 and 132-2. According to some examples, these GAS initial requests may be generated in a message format that may be in compliance with an access network query protocol (ANQP) for communicating queries to advertisement servers of a network according to IEEE 802.11u or Hotspot 2.0.

Proceeding to process 3.4 (GAS Initial Resp.), logic and/or features at APs 122-3 and 132-2 may be capable of sending GAS initial responses to indicate receipt of the GAS initial requests from mobile device 110. In some examples, these GAS initial requests may also be generated in a message format in compliance with ANQP.

Proceeding to process 3.5 (ANQP Request), logic and/or features at APs 122-3 and 132-2 may be capable of relaying messages related to the GAS initial request to advertisement servers 124 and 134, respectively using the ANQP message format. According to some examples, the ANQP requests may include query requests that relay at least some contents of the GAS request messages from mobile device 110 to advertisement servers 124 and 134.

Proceeding from process 3.6 (ANQP Response), logic and/or features at APs 122-3 and 132-2 may be capable of receiving ANQP response messages from advertisement servers 124 and 134. In some examples, the ANQP response messages may include responses to the query requests from the relayed messages related to the GAS request messages from mobile device 110.

Proceeding to process 3.7 (GAS Comeback Req.), logic and/or features at mobile device 110 may be capable of generating GAS comeback request messages and sending the GAS comeback request messages to APs 122-3 and 132-2 to request information related to responses received from the advertisement servers 124 and 134. In some examples, these GAS comeback requests may also be in a message format in compliance with ANQP.

Proceeding to process 3.8 (GAS Comeback Resp.), logic and/or features at APs 122-3 and 132-2 may send a GAS comeback response that provides the query responses from advertisement servers 124 and 134. According to some examples, comeback response messages may also be in a message format in compliance with ANQP and may include network information from networks 120 and 130.

Proceeding to process 3.9 (Assoc. Req.), logic and/or features at mobile device 110 may be capable of placing an association request with AP 122-2 of ESS-1. According to some examples, the logic and/or features at mobile device 110 may have decided that based on the information received from advertisement server 124 in the GAS comeback response message, network 120 was the preferred network via which to connect.

In some examples, the determination may have been based on a pre-existing subscriber agreement that allows access to network 120 or may be based on other factors such as security characteristics, bandwidth capabilities, cost to access or other factors that may make network 120 a more desirable connection than network 130. As shown in FIG. 3, AP 122-2 was the AP that mobile device 110 sent the authentication request. AP 122-2 was not the same AP as used to relay GAS request/response messages. The logic and/or features of mobile device 110 could have chosen the same AP but communication signal strengths or quality characteristics may have changed such that AP 122-2 may have the better CL for connecting to network 120. Process 300 then comes to an end.

Figure 4:
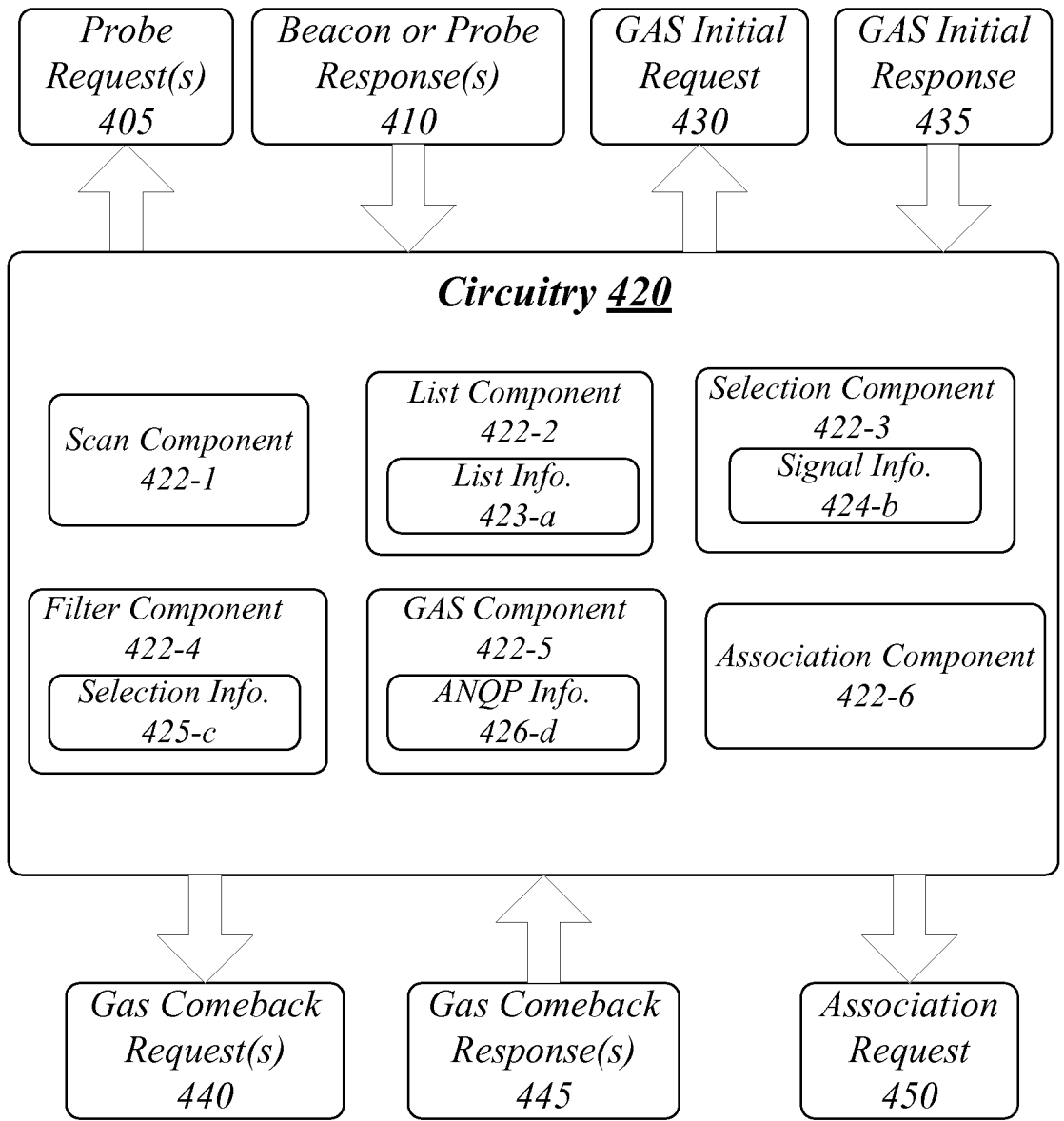
FIG. 4 illustrates an example block diagram for a first apparatus.

FIG. 4 illustrates a block diagram for a first apparatus. As shown in FIG. 4, the first apparatus includes an apparatus 400. Although apparatus 400 shown in FIG. 4 has a limited number of elements in a certain topology or configuration, it may be appreciated that apparatus 400 may include more or less elements in alternate configurations as desired for a given implementation.

The apparatus 400 may comprise a computer and/or firmware implemented apparatus 400 having circuitry 420 arranged to execute one or more components 422-$a$. It is worthy to note that "a" and "b" and "c" and similar designators as used herein are intended to be variables representing any positive integer. Thus, for example, if an implementation sets a value for a=6, then a complete set of components 422-$a$ may include components 422-1, 422-2, 422-3, 422-4, 422-5 or 422-6. The examples are not limited in this context.

According to some examples, apparatus 400 may be part of a mobile device that may be capable of operating in compliance with one or more wireless technologies such as those described in or associated with the IEEE 802.11 standards. For example, the mobile device having apparatus 400 may be arranged or configured to wirelessly couple to or connect to an access point for a network operated in compliance with IEEE 802.11 standards including IEEE 802.11u and/or specifications such as WFA Hotspot 2.0.

In some examples, as shown in FIG. 4, apparatus 400 includes circuitry 420. Circuitry 420 may be generally arranged to execute one or more components 422-$a$. Circuitry 420 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as circuitry 420. According to some examples, circuitry 420 may also be an application specific integrated circuit (ASIC) and components 422-$a$ may be implemented as hardware elements of the ASIC.

According to some examples, apparatus 400 may include a scan component 422-1. Scan component 422-1 may be executed by circuitry 420 to scan for access points belonging to one or more ESS separately belonging to one or more networks having one or more advertisement servers for separately providing a GAS to a mobile device that may include apparatus 400. For these examples, the scan may be accomplished via the sending of probe request(s) 405 to APs in the one or more networks and receiving beacon or probe response(s) 410 from responding APs.

In some examples, apparatus 400 may also include a list component 422-2. List component 422-2 may be executed by circuitry 420 to build one or more lists of access points belonging to the one or more ESSs that provided beacon probe response(s) 410. For these examples, beacon or probe response(s) 410 may be in the example format of beacon or probe response format 200 and may include BSSID, HESSID and PAME-BI indicator information from each of the responding APs. List component 422-2 may gather information related to APs from beacon or probe response(s) 410 in a list for a given ESS and at least temporarily store the list with list info. 423-$a$. According to some examples, list component 422-2 may maintain list info. 423-$a$ in a data structure such as a lookup table (LUT).

According to some examples, apparatus 400 may also include a selection component 422-3. Selection component 422-3 may be executed by circuitry 420 to select APs from each built list to use as an AP for relaying messages related to the GAS provided by the advertisement server to the mobile device. For these examples, GAS initial request(s) 430, GAS initial response(s) 435, GAS comeback request(s) 440 and GAS comeback response(s) 445 may be the messages relayed by selected APs from the built lists. For these examples, selection component 422-3 may at least temporarily store information in signal info. 424-$b$ to indicate measured signal strengths and/or quality for CLs with responding APs. The selection of a given AP from among a built list of APs may be based on the information maintained in signal info. 424-$b$. In some examples, signal info. 424-$b$ may be maintained in a LUT or other type of data structure.

In some examples, apparatus 400 may also include a filter component 422-4. Filter component 422-4 may be executed by circuitry 420 to ignore or disregard beacon or probe responses from other APs in a given ESS once an AP has been selected for relaying messages related to the GAS provided by the advertisement server. Filter component 422-4 may at least temporarily maintain selection information that identifies which AP(s) were selected with selection info. 425-$c$. According to some examples, selection info. 425-$c$ may be maintained in a LUT or other type of data structure.

According to some examples, apparatus 400 may also include a GAS component 422-5. GAS component 422-5 may be executed by circuitry 420 to send and/or receive one or more GAS request/response messages to selected APs. For these examples, the GAS request/response messages may include GAS initial request(s) 430, GAS initial response(s) 435, GAS comeback request(s) 440 and GAS comeback response(s) 445 and these messages may be in a format that complies with ANQP. In some examples, ANQP info. 426-$d$ may be maintained by GAS component 422-5 and may include protocol information used to generate, encode or decode GAS request/response messages. ANQP info. 426-*d* may be maintained in a LUT or other type of data structure.

In some examples, apparatus 400 may also include an association component 422-6. Association component 422-6 may be executed by circuitry 420 to determine whether to connect to the network for the advertisement server based on the information included in the one or more GAS response messages. Association component 422-6, based on the determination, may send an association request to an AP from among the built list of APs belonging to the ESS belonging to the network if connection is desired and/or permissible. For these examples, association request 450 may then be sent to the AP to initiate a connection process to the network.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 5 illustrates an example of a first logic flow. As shown in FIG. 5, the first logic flow includes a logic flow 500. Logic flow 500 may be representative of some or all of the operations executed by one or more logic, features, or devices described herein, such as apparatus 400. More particularly, logic flow 500 may be implemented by scan component 422-1, list component 422-2, selection component 422-3, filter component 422-4, GAS component 422-5 or association component 422-6.

In the illustrated example shown in FIG. 5, logic flow 500 at block 502 may scan for access points belonging to one or more ESSs separately belonging to one or more networks separately having one or more advertisement servers for separately providing a GAS service to a mobile device. In some examples, the mobile device may include an apparatus 400 having a scan component 422-1 to cause probe request(s) 405 to be sent for the mobile device and receive beacon probe response(s) 410 from responding APs. For these examples, each beacon or probe response of beacon or probe response(s) 410 may include an identifier (e.g., BSSID) for a respective responding AP and an identifier for the ESS the AP belong to (e.g., HESSID). Each beacon or probe response may also include an indication of whether an advertisement server for the ESS will provide a response to a GAS request message from the mobile device that is independent of what access point included in the ESS the mobile device selects to use to relay GAS messages to the advertisement server (e.g., asserted PAME-BI bit).

According to some examples, logic flow 500 at block 504 may build a list of APs belonging to a first ESS from among the one or more ESSs based on the scan conducted at block 502. For these examples, the first ESS may belong to a first network having a first advertisement server. The list may be built by list component 422-2 based on beacon or probe response(s) 410 received from responding APs belonging to the first ESS.

In some examples, logic flow 500 at block 506 may select a first AP from the list to use the first AP to relay GAS messages related to the GAS provided by the first advertisement server to the mobile device. For these examples, selection component 422-3 may select the first AP based on that AP having the highest signal strength compared to other APs on the list built by list component 422-2.

According to some examples, logic flow 500 at block 508 may send one or more GAS request messages to the first AP and receive one or more GAS response messages from the first AP. For these examples, GAS component 422-5 may send or receive GAS initial request(s) 430, GAS initial response(s) 435, GAS comeback request(s) 440 and GAS comeback response(s) 445. Also, these messages may be sent or received in a message format in compliance with ANQP.

In some examples, logic flow 500 at block 510 may determine whether to connect to the first network based on information included in the one or more GAS response messages. Logic flow 500 may also send an association request based on the determination to an AP from the list of APs belonging to the first ESS. The association request may be to initiate a connection to the first network through the AP. For these examples, association component 422-6 may include the association request in association request 450 to initiate the connection.

FIG. 6 illustrates an embodiment of a first storage medium. As shown in FIG. 6, the first storage medium includes a storage medium 600. Storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions to implement logic flow 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
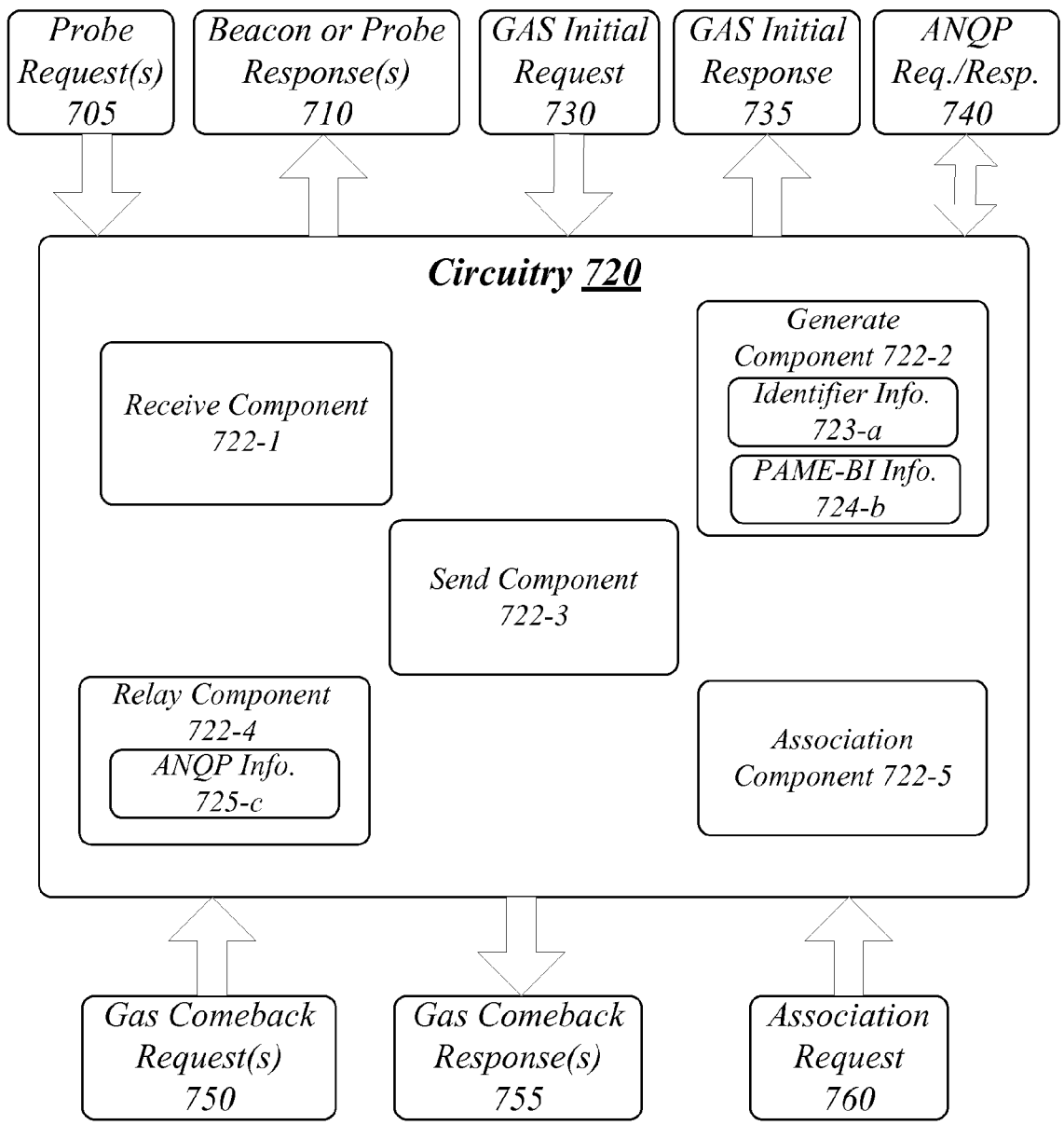
FIG. 7 illustrates an example block diagram for a second apparatus.

FIG. 7 illustrates a block diagram for a second apparatus. As shown in FIG. 7, the second apparatus includes an apparatus 700. Although apparatus 700 shown in FIG. 7 has a limited number of elements in a certain topology or configuration, it may be appreciated that apparatus 700 may include more or less elements in alternate configurations as desired for a given implementation.

The apparatus 700 may comprise a computer and/or firmware implemented apparatus 700 having a circuitry 720 arranged to execute one or more components 722-*a*. Similar to apparatus 400 for FIG. 4, "a" and "b" and "c" and similar designators may be variables representing any positive integer.

According to some examples, apparatus 700 may be part of an AP possibly belonging to an ESS belonging to a network. The AP may be capable of operating in compliance with one or more wireless technologies such as those described in or associated with the IEEE 802.11 standards such as IEEE 802.11u or the Hotspot 2.0 specification. For example, the device having apparatus 700 may be arranged or configured to wirelessly couple to a mobile device via a communication link established and/or operated according to IEEE 802.11u or WFA Hotspot 2.0 to enable the mobile device to receive information services such as GAS from an advertisement server for a network. The examples are not limited in this context.

In some examples, as shown in FIG. 7, apparatus 700 includes circuitry 720. Circuitry 720 may be generally arranged to execute one or more components 722-a. The circuitry 720 can be any of various commercially available processors to include, but not limited to, those previously mentioned for processing circuit 420 for apparatus 400. Dual microprocessors, multi-core processors, and other multi-processor architectures may also be employed as circuitry 720. According to some examples circuitry 720 may also be an application specific integrated circuit (ASIC) and components 722-a may be implemented as hardware elements of the ASIC.

According to some examples, apparatus 700 may include a receive component 722-1. Receive component 722-1 may be executed by circuitry 720 to receive a probe request message(s) 705 associated with a scan by a mobile device seeking access points for a network. For these examples, the AP having apparatus 700 may belong to an ESS for the network. Also, the network may have an advertisement server for providing an information service such as GAS to the mobile device.

In some examples, apparatus 700 may also include a generate component 722-2. Generate component 722-2 may be executed by circuitry 720 to generate beacon or probe response(s) 710 that include an identifier for the access point (e.g., BSSID), an identifier for the ESS (e.g., HESSID), and an indication of whether the advertisement server will provide a response to a GAS request message from the mobile device that is independent of what AP included in the ESS the mobile device selects to use to relay messages to the advertisement server (e.g., PAME-BI bit). For these examples, generate component 722-2 may maintain the BSSID and HESSID information with identifier info. 723-a (e.g., in a LUT) and may also maintain PAME-BI bit information in PAME-BI info. 724-b (e.g., in a LUT).

According to some examples, apparatus 700 may also include a send component 722-3. Send component 722-3 may be executed by circuitry 720 to cause probe response(s) 710 generated by generate component 722-2 to be sent to the mobile device. For these examples, beacon or probe response(s) 710 may be in a similar format described for example beacon or probe response format 200 in FIG. 2.

In some examples, apparatus 700 may also include a relay component 722-4. Relay component 722-4 may be executed by circuitry 720 to receive various GAS request messages such as GAS initial request 730 and GAS comeback request(s) 750 and send GAS initial response 735 and GAS comeback response(s) 755, respectively based on ANQP Req./Resp. messages 740 exchanged with the advertisement server to relay messages related to the GAS provided by the advertisement server to the mobile device. For these examples, relay component 722-4 may maintain protocol information in ANQP info. 725-c to generate, encode or decode messages in the ANQP message format. Relay component 722-4 may be maintained ANQP info 725-c in a data structure such as a LUT.

According to some examples, apparatus 700 may also include an association component 722-5. Association component 722-5 may be executed by circuitry 720 to receive an association request 760 from a mobile device. For these examples, the mobile device may have decided to initiation a connection process with the network based on the information relayed to the mobile device from the AP.

Various components of apparatus 700 and a device implementing apparatus 700 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 8 illustrates an example of a second logic flow. As shown in FIG. 8, the second logic flow includes a logic flow 800. Logic flow 800 may be representative of some or all of the operations executed by one or more logic, features, or devices described herein, such as apparatus 700. More particularly, logic flow 800 may be implemented by receive component 722-1, generate component 722-2, send component 722-3, relay component 722-4 or association component 722-5.

In the illustrated example shown in FIG. 8, logic flow 800 at block 802 may receive a probe request message related to a scan by a mobile device seeking APs for a network. The AP may belong to an ESS for the Network. Also, the network may have an advertisement server for providing a GAS to the mobile service that may include discovery information about the network. For these examples, receive component 722-1 may receive probe request(s) 705 has part of the scan by the mobile device.

According to some examples, logic flow 800 at block 804 may generate a beacon or probe response message that includes an identifier for the AP (e.g., BSSID), an identifier for the ESS (HESSID), an indication of whether the advertisement server will provide a response to a GAS request message from the mobile device that is independent of what AP included in the ESS the mobile device selects to use to relay messages to the advertisement server (e.g., PAME-BI bit). For these examples, generate component 722-2 may generate probe response(s) 710 that includes the above mentioned information.

According to some examples, logic flow 800 at block 806 may cause the beacon or probe response message to be sent to the mobile device. For these examples, send component 722-3 may cause beacon or probe response(s) 710 to be sent to the mobile device.

In some examples, logic flow 800 at block 808 may relay GAS related messages between the mobile device and the advertisement server. For these examples, relay component 722-4 may receive various GAS request messages such as GAS initial request 730 and GAS comeback request(s) 750 and send GAS initial response 735 and GAS comeback response(s) 755, respectively based on ANQP Req./Resp. messages 740 exchanged with the advertisement server in order to relay the GAS related messages.

FIG. 9 illustrates an embodiment of a first storage medium. As shown in FIG. 9, the first storage medium includes a storage medium 900. Storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
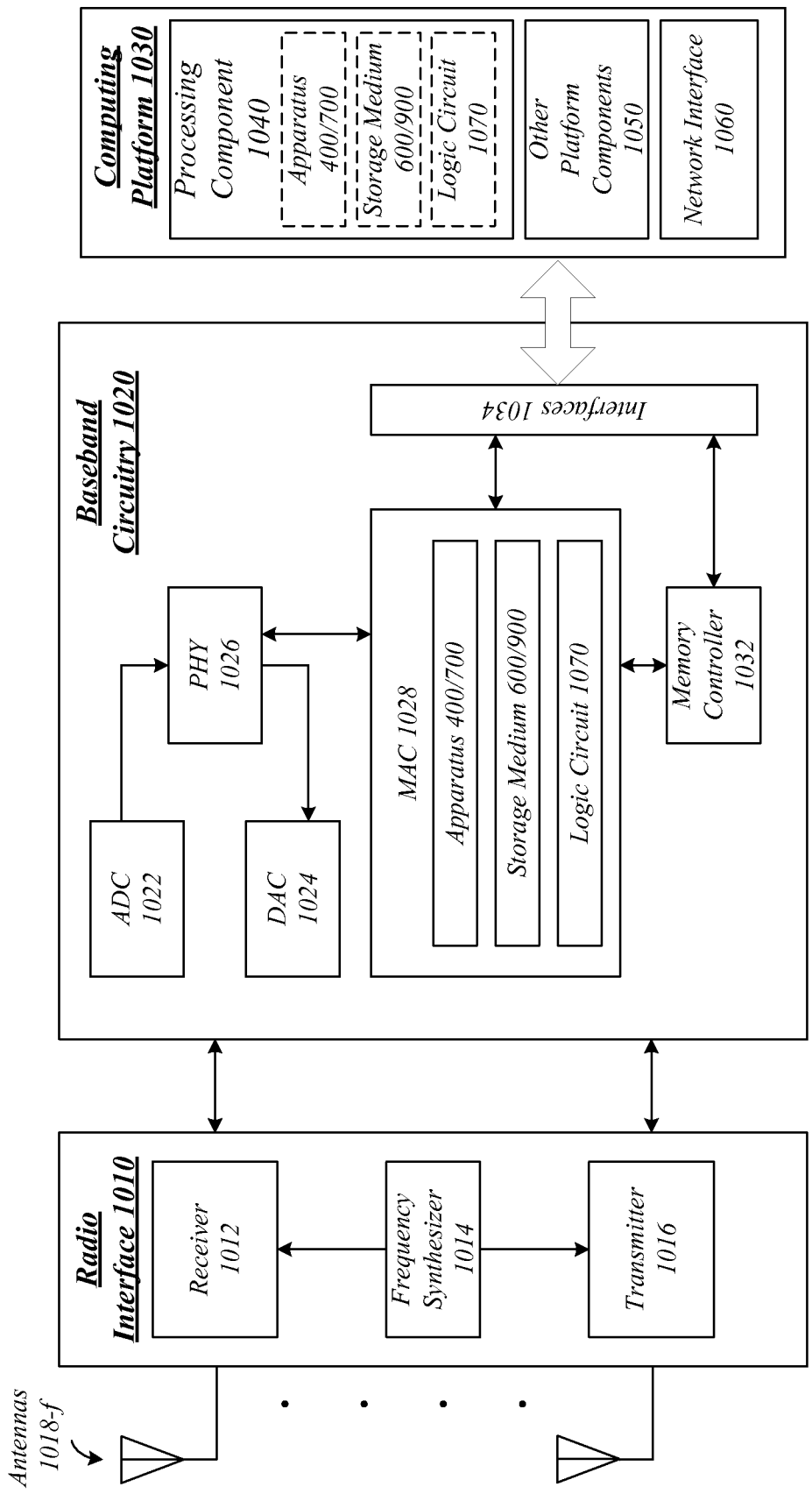
FIG. 10 illustrates an example of a device.

FIG. 10 illustrates an embodiment of a device 1000. In some examples, device 1000 may be configured or arranged for wireless communications in a wireless network. Device 1000 may implement, for example, apparatus 400/700, storage medium 600/900 and/or a logic circuit 1070. The logic circuit 1070 may include physical circuits to perform operations described for apparatus 400/700. As shown in FIG. 10, device 1000 may include a radio interface 1010, baseband circuitry 1020, and computing platform 1030, although examples are not limited to this configuration.

The device 1000 may implement some or all of the structure and/or operations for apparatus 400/700, storage medium 600/900 and/or logic circuit 1070 in a single computing entity, such as entirely within a single device. The embodiments are not limited in this context.

radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 1010 may include, for example, a receiver 1012, a transmitter 1016 and/or a frequency synthesizer 1014. Radio interface 1010 may include bias controls, a crystal oscillator and/or one or more antennas 1018-f. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1026 for PHY link layer processing of respective receive/transmit signals. Baseband circuitry 1020 may include, for example, a processing circuit 1028 for medium access control (MAC)/data link layer processing. Baseband circuitry 1020 may include a memory controller 1032 for communicating with MAC processing circuit 1028 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames (e.g., containing subframes). Alternatively or in addition, MAC processing circuit 1028 may share processing for certain of these functions or perform these processes independent of PHY processing circuit 1026. In some embodiments, MAC and PHY processing may be integrated into a single circuit.

Computing platform 1030 may provide computing functionality for device 1000. As shown, computing platform 1030 may include a processing component 1040. In addition to, or alternatively of, baseband circuitry 1020 of device 1000 may execute processing operations or logic for apparatus 400/700, storage medium 600/900, and logic circuit 1070 using the processing component 1030. Processing component 1040 (and/or PHY 1026 and/or MAC 1028) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1030 may further include a network interface 1060. In some examples, network interface 1060 may include logic and/or features to support network interfaces operated in compliance with one or more wireless broadband technologies such as those described in one or more standards associated with IEEE 802.11 such as IEEE 802.11ad.

Device 1000 may be, for example, user equipment, a computer, a personal computer (PC), a desktop computer, a laptop computer, a notebook computer, a netbook computer, a tablet computer, an ultrabook computer, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 1000 described herein, may be included or omitted in various embodiments of device 1000, as suitably desired. In some embodiments, device 1000 may be configured to be compatible with protocols and frequencies associated with IEEE 802.11 Standards for WLANs and/or for wireless docking, although the examples are not limited in this respect.

Embodiments of device 1000 may be implemented using single input single output (SISO) architectures. However, certain implementations may include multiple antennas (e.g., antennas 1018-*f*) for transmission and/or reception using adaptive antenna techniques for beamforming or spatial division multiple access (SDMA) and/or using multiple input multiple output (MIMO) communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In some examples, an example first apparatus at a mobile device may include circuitry. For these examples, the example first apparatus may also include a scan component to be executed by the circuitry to scan for access points belonging to one or more ESSs separately belonging to one or more networks separately having one or more advertisement servers for separately providing a GAS to the mobile device. The example first apparatus may also include a list component to be executed by the circuitry to build a first list of access points belonging to a first ESS from among the one or more ESSs based on the scan. The first ESS may belong to a first network having a first advertisement server. The example first apparatus may also include a select component to be executed by the circuitry to select a first access point from the first list to use the first access point to relay messages related to the GAS provided by the first advertisement server to the mobile device.

According to some examples, the example first apparatus may also include the list component to build a second list of access points belonging to a second ESS from among the one or more ESSs based on the scan, the second ESS belonging to a second network having a second advertisement server. For these examples, the select component may select a second access point from the second list to use the second access point to relay messages related to the GAS provided by the second advertisement server to the mobile device.

In some examples for the example first apparatus, the scan component may scan for access points by causing one or more probe request messages to be sent from the mobile device to the access points belonging to the one or more ESSs. The scan component may also scan for access points by receiving separate beacon or probe responses from at least some of the access points belonging to the first ESS. For these examples, each received beacon or probe response may include an identifier for a respective responding access point, an identifier for the first ESS, and an indication of whether an advertisement server for the first ESS will provide a response to a GAS request message from the mobile device that is independent of what access point included in the first ESS the mobile device selects to use to relay GAS messages to the advertisement server.

According to some examples for the example first apparatus, the first list component may build the list based on information included in the separate beacon or probe responses received by the scan component. For these examples, the select component, may select the first access point from the first list based on the first access point having a strongest communication signal as compared to other responding access points for the first ESS.

In some examples for the example first apparatus, the mobile device and the access points may belong to the one or more ESSs capable of operating in compliance with at least one or more wireless communication standards or specifications associated with the IEEE 802.11 standards to include IEEE 802.11u or associated with the Hotspot 2.0 Technical Specification.

According to some examples for the example first apparatus, the identifier for the respective responding access point may include a BSSID. For these examples, the identifier for the first ESS may include a HESSID. Also, for these examples, the indication of whether an advertisement server for the first ESS will provide GAS response messages to the mobile device that are independent of what access point included in the first ESS the mobile device selects is indicated by a PAME-BI bit included in the probe response message sent by the respective responding access point.

In some examples, the example first apparatus may also include a GAS component to be executed by the circuitry to send one or more GAS request messages to the first access point using a message format in compliance with ANQP. For these examples, the GAS component may also receive one or more GAS response messages from the first access point. The one or more GAS response messages may also be in compliance with the ANQP message format. The example first apparatus may also include an association component to be executed by the circuitry to determine whether to connect to the first network based on information included in the one or more GAS response messages. The association component may then send an association request based on the determination to an access point from the first list of access points belonging to the first ESS. The association request may initiate connection to the first network through the access point.

In some examples, example first methods implemented at a mobile device may include scanning for access points belonging to one or more ESSs separately belonging to one or more networks separately having one or more advertisement servers for separately providing a GAS to the mobile device. The example first methods may also include building a list of access points belonging to a first ESS from among the one or more ESSs based on the scan. The first ESS may belong to a first network having a first advertisement server. The example first methods may also include selecting a first access point from the list to use the first access point to relay messages related to a first GAS provided by the first advertisement server to the mobile device.

According to some examples, the example first methods may also include building another list of access points belonging to a second ESS from among the one or more ESSs based on the scan. For these examples, the second ESS may belong to a second network having a second advertisement server. Also, the example first methods may also include selecting a second access point from the other list to use the second access point to relay messages related to a second GAS provided by the second advertisement server to the mobile device.

In some example, the example first methods may also include sending probe request messages to the access points belonging to the one or more ESSs. The example first methods may also include receiving separate beacon or probe responses from at least some of the access points belonging to the first ESS. For these examples, each received beacon or probe response may include an identifier for a respective responding access point, an identifier for the first ESS, and an indication of whether an advertisement server for the first ESS will provide a response to a GAS request message from the mobile device that is independent of what access point included in the first ESS the mobile device selects to use to relay GAS messages to the advertisement server. The example first methods may also include building the list based on information included in the separate beacon or probe responses.

According to some examples for the example first methods, selecting the first access point from the list may be based on the first access point having a higher quality communication signal as compared to other responding access points for the first ESS.

In some examples for the example first methods, the mobile device and the access points may belong to the one or more ESSs capable of operating in compliance with at least one or more wireless communication standards or specifications associated with the IEEE 802.11 standards to include IEEE 802.11u or associated with the Hotspot 2.0 Technical Specification.

According to some examples for the example first methods, the identifier for the respective responding access point may include a BSSID. The identifier for the first ESS may include a HESSID. The indication of whether an advertisement server for the first ESS will provide GAS response messages to the mobile device that are independent of what access point included in the first ESS the mobile device selects may be indicated by PAME-BI bit included in the beacon or probe response message sent by the respective responding access point.

In some examples, the example first methods may also include sending one or more GAS request messages to the first access point using a message format in compliance with ANQP. The example first methods may also include receiving one or more GAS response messages from the first access point, the one or more GAS response messages also in compliance with the ANQP message format. The example first methods may also include determining whether to connect to the first network based on information included in the one or more GAS response messages and sending an association request based on the determination to an access point from the list of access points belonging to the first ESS. The association request may initiate connection to the first network via the access point.

In some examples, a first at least one machine readable medium may include a plurality of instructions that in response to being executed on a system at a mobile device cause the system to receive scan, at the mobile device, for access points belonging to one or more ESSs separately belonging to one or more networks separately having one or more advertisement servers for separately providing a GAS to the mobile device. The instruction may also cause the system to build a first list of access points belonging to a first ESS from among the one or more ESSs based on the scan. The first ESS may belong to a first network having a first advertisement server. The instruction may also cause the system to select a first access point from the first list to use the first access point to relay messages related to a first GAS provided by the first advertisement server to the mobile device. The instruction may also cause the system to build a second list of access points belonging to a second ESS from among the one or more ESSs based on the scan. The second ESS may belong to a second network having a second advertisement server. The instruction may also cause the system to select a second access point from the other list to use the second access point to relay messages related to a second GAS provided by the second advertisement server to the mobile device.

According to some examples for the first at least one machine readable medium, to scan includes the instructions to cause the system to send probe request messages to the access points belonging to the one or more ESSs. To scan may also include the instructions to cause the system to receive separate beacon probe responses from at least some of the access points belonging to the first and second ESSs. For these examples, each received probe response may include an identifier for a respective responding access point, an identifier for the first or second ESS, and an indication of whether an advertisement server for the first or second ESS will provide a response to a GAS request message from the mobile device that is independent of what access point included in the first or second ESS the mobile device selects to use to relay GAS messages between the advertisement server for the first or second ESS. To scan may also include the instructions to cause the system to build the first and second lists based on information included in the separate beacon or probe responses.

In some examples for the first at least one machine readable medium, the mobile device and the access points may belong to the one or more ESSs capable of operating in compliance with at least one or more wireless communication standards or specifications associated with the IEEE 802.11 standards to include IEEE 802.11u or associated with the Hotspot 2.0 Technical Specification.

According to some examples for the first at least one machine readable medium, the identifier for the respective responding access point may include BSSID. The identifier for the first or second ESS may include a HESSID. The indication of whether an advertisement server for the first or second ESS will provide GAS response messages to the mobile device that are independent of what access point included in the first or second ESS the mobile device selects may be indicated by a PAME-BI bit included in the probe response message sent by the respective responding access point.

In some examples for the first at least one machine readable medium, the instructions may also cause the system to send one or more GAS request messages to the first access point using a message format in compliance with ANQP. The instructions may also cause the system to receive one or more GAS response messages from the first access point, the one or more GAS response messages also in compliance with the ANQP message format and determine whether to connect to the first network based on information included in the one or more GAS response messages. The instructions may also cause the system to send an association request based on the determination to an access point from the first list of access points belonging to the first ESS. The association request may initiate connection to the first network through the access point.

In some examples an example second apparatus for an access point for a network may include circuitry. The example second apparatus may also include a receive component to be executed by the circuitry to receive a probe request message related to a scan by a mobile device seeking access points for a network. The access point may belong to an ESS for the network. The network may have an advertisement server for providing a GAS to the mobile device. The example second apparatus may also include a generate component to be executed by the circuitry to generate a beacon or probe response message that includes an identifier for the access point, an identifier for the ESS, and an indication of whether the advertisement server will provide a response to a GAS request message from the mobile device that is independent of what access point included in the ESS the mobile device selects to use to relay messages to the advertisement server. The example second apparatus may also include a send component to be executed by the circuitry to cause the beacon or probe response to be sent to the mobile device.

According to some examples for the example second apparatus, the access point and the mobile device may be capable of operating in compliance with at least one or more wireless communication standards or specifications associated with the IEEE 802.11 standards to include IEEE 802.11u or associated with the Hotspot 2.0 Technical Specification.

In some examples for the example second apparatus, the identifier for the access point may include a BSSID. The identifier for the ESS may include a HESSID. The indication of whether the advertisement server will provide GAS response messages to the mobile device that are independent of what access point included in the ESS the mobile device selects may be indicated by a PAME-BI bit included in the probe response message.

According to some examples, the example second apparatus may also include a relay component to be executed by the circuitry to receive one or more GAS request messages from the mobile device destined for the advertisement server, the one or more GAS request messages in a ANQP message format. The relay component may also forward one or more messages related to the one or more GAS request messages to the advertisement server using the ANQP message format. The relay component may also receive one or more response messages from the advertisement server in the ANQP message format. The relay component may also forward one or more GAS response messages to the mobile device in the ANQP message format that incorporates the response message from the advertisement server to provide the GAS to the mobile device.

In some examples, example second methods implemented at an access point for a network may include receiving, at the access point, a probe request message related to a scan by a mobile device seeking access points for a network. The access point may belong to an ESS for the network. The network may have an advertisement server for providing a GAS to the mobile device. The example second methods may also include generating a beacon or probe response message that includes an identifier for the access point, an identifier for the ESS, and an indication of whether the advertisement server will provide a response to a GAS request message from the mobile device that is independent of what access point included in the ESS the mobile device selects to use to relay messages to the advertisement server. The example second methods may also include sending the beacon or probe response to the mobile device.

According to some examples for the example second methods, the access point and the mobile device may be capable of operating in compliance with at least one or more wireless communication standards or specifications associated with the IEEE 802.11 standards to include IEEE 802.11u or associated with the Hotspot 2.0 Technical Specification.

In some examples for the example second methods, the identifier for the access point may include a BSSID. The identifier for the ESS may include a HESSID. The indication of whether the advertisement server will provide GAS response messages to the mobile device that are independent of what access point included in the ESS the mobile device selects may be indicated by a PAME-BI bit included in the probe response message.

In some examples, the example second methods may also include receiving one or more GAS request messages from the mobile device destined for the advertisement server, the one or more GAS request messages in a ANQP message format. The example second methods may also include forwarding one or more messages related to the one or more GAS request messages to the advertisement server using the ANQP message format. The example second methods may also include receiving one or more response messages from the advertisement server in the ANQP message format. The example second methods may also include forwarding one or more GAS response messages to the mobile device in the ANQP message format that incorporates the response message from the advertisement server to provide the GAS to the mobile device.

According to some examples for the example second methods, the network may be operated by a service provider of a wide area network via which the mobile device is capable of connecting to according to a subscriber agreement.

In some examples, a second at least one machine readable medium may include a plurality of instructions that in response to being executed on a system for a network may cause the system to receive, at the access point, a probe request message related to a scan by a mobile device seeking access points for a network. The access point may belong to an ESS for the network. The network may have an advertisement server for providing a GAS to the mobile device. The instructions may also cause the system to generate a beacon or probe response message that includes an identifier for the access point, an identifier for the ESS, and an indication of whether the advertisement server will provide a response to a GAS request message from the mobile device that is independent of what access point included in the ESS the mobile device selects to use to relay messages to the advertisement server. The instructions may also cause the system to send the beacon or probe response to the mobile device.

According to some examples for the second at least one machine readable medium, the access point and the mobile device may be capable of operating in compliance with at least one or more wireless communication standards or specifications associated with the IEEE 802.11 standards to include IEEE 802.11u or associated with the Hotspot 2.0 Technical Specification. The identifier for the access point may include a BSSID. The identifier for the ESS may include a HESSID. The indication of whether the advertisement server will provide GAS response messages to the mobile device that are independent of what access point included in the ESS the mobile device selects may be indicated by a PAME-BI bit included in the probe response message.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. An apparatus comprising:
    circuitry;
    a scan component to be executed by the circuitry to scan for access points belonging to two or more extended service sets (ESSs), each of the ESSs belonging to at least one of two or more networks, each of the two or more networks having at least one advertisement server, and each advertisement server capable of providing a generic advertisement service (GAS) to a mobile device;
    a list component to be executed by the circuitry to build a first list of access points belonging to a first ESS from among the two or more ESSs based on the scan, the first ESS belonging to a first network having a first advertisement server, and build a second list of access points belonging to a second ESS from among the two or more ESSs based on the scan, the second ESS belonging to a second network having a second advertisement server;
    a select component to be executed by the circuitry to select a first access point from the first list of access points to use the first access point to relay messages related to the GAS provided by the first advertisement server to the mobile device, and select a second access point from the second list of access points to use the second access point to relay messages related to the GAS provided by the second advertisement server to the mobile device; and
    a GAS component to be executed by the circuitry to send one or more GAS request messages only to the first access point based on the selection of the first access point, the GAS component to use the first access point to relay the respective one or more GAS request messages to the first advertisement server and send one or more GAS request messages only to the second access point based on the selection of the second access point, the GAS component to use the second access point to relay the respective one or more GAS request messages to the second advertisement server.

2. The apparatus of claim 1, comprising the scan component to scan for access points by:
    causing one or more probe request messages to be sent from the mobile device to the access points belonging to the two or more ESSs; and
    receiving separate beacon or probe responses from at least some of the access points belonging to the first and second ESSs, each received beacon or probe response to include an identifier for a respective responding access point, an identifier for a respective ESS, and an indication of whether an advertisement server for the respective ESS will provide a response to a GAS request message from the mobile device that is independent of what access point included in the respective ESS the mobile device selects to use to relay GAS messages to the advertisement server.

3. The apparatus of claim 2, comprising the list component to build the first and second lists of access points based on information included in the separate beacon or probe responses received by the scan component and the select component to select the first access point from the first list based on the first access point having a strongest communication signal as compared to other responding access points for the first ESS, and select the second access point from the second list based on the second access point having a strongest communication signal as compared to other responding access points for the second ESS.

4. The apparatus of claim 2, the mobile device and the access points belonging to the two or more ESSs capable of operating in compliance with at least one or more wireless communication standards or specifications associated with the Institute of Electrical and Electronic Engineers (IEEE) 802.11 standards to include IEEE 802.11u or associated with the Hotspot 2.0 Technical Specification.

5. The apparatus of claim 4, the identifier for the respective responding access point to include a basic service set identification (BSSID), the identifier for the respective ESS including a homogeneous ESS identifier (HESSID), and the indication of whether an advertisement server for the respective ESS will provide GAS response messages to the mobile device that are independent of what access point included in the respective ESS the mobile device selects is indicated by a pre-association message exchange BSSID independent (PAME-BI) bit included in the beacon or probe response message sent by the respective responding access point.

6. The apparatus of claim 1, comprising: the GAS component to send the one or more GAS request messages to the first and second access points using a message format in compliance with an access network query protocol (ANQP), the GAS component to also receive respective one or more GAS response messages from the first and second access points, the respective one or more GAS response messages also in compliance with the ANQP message format; and an association component to be executed by the circuitry to determine whether to connect to the first network or the second network based on information included in the respective one or more GAS response messages and send an association request based on the determination to an access point from the first list of access points belonging to the first ESS or the second list of access points belonging to the second ESS, the association request to initiate connection to the first network or the second network through the access point.

7. A computer-implemented method comprising:
scanning, at a mobile device, for access points belonging to two or more extended service sets (ESSs), each of the ESSs belonging to at least one of two or more networks, each of the two or more networks having at least one advertisement server, and each advertisement server capable of providing a generic advertisement service (GAS) to the mobile device;

building a first list of access points belonging to a first ESS from among the two or more ESSs based on the scan, the first ESS belonging to a first network having a first advertisement server, and build a second list of access points belonging to a second ESS from among the two or more ESSs based on the scan, the second ESS belonging to a second network having a second advertisement server;

selecting a first access point from the first list of access points to use the first access point to relay messages related to a first GAS provided by the first advertisement server to the mobile device, and select a second access point from the second list of access points to use the second access point to relay messages related to the GAS provided by the second advertisement server to the mobile device; and sending one or more GAS request messages only to the first access point from the first list of access points based on the selection and to relay the respective one or more GAS request messages to the first advertisement server, and send one or more GAS request messages only to the second access point from the second list of access points based on the selection, the GAS component to use the second access point to relay the respective one or more GAS request messages to the second advertisement server.

8. The method of claim 7, scanning comprises:
sending probe request messages to the access points belonging to the two or more ESSs;
receiving separate beacon or probe responses from at least some of the access points belonging to the first and second ESSs, each received beacon or probe response to include an identifier for a respective responding access point, an identifier for a respective the ESS, and an indication of whether an advertisement server for the respective ESS will provide a response to a GAS request message from the mobile device that is independent of what access point included in the respective ESS the mobile device selects to use to relay GAS messages to the advertisement server; and building the first and second lists based on information included in the separate beacon or probe responses.

9. The method of claim 8, the mobile device and the access points belonging to the two or more ESSs capable of operating in compliance with at least one or more wireless communication standards or specifications associated with the Institute of Electrical and Electronic Engineers (IEEE) 802.11 standards to include IEEE 802.11u or associated with the Hotspot 2.0 Technical Specification.

10. The method of claim 9, the identifier for the respective responding access point including a basic service set identification (BSSID), the identifier for the respective ESS including a homogeneous ESS identifier (HESSID), and the indication of whether an advertisement server for the respective ESS will provide GAS response messages to the mobile device that are independent of what access point included in the respective ESS the mobile device selects is indicated by a pre-association message exchange BSSID independent (PAME-BI) bit included in the beacon or probe response message sent by the respective responding access point.

11. The method of claim 7, comprising selecting the first access point from the first list based on the first access point having a higher quality communication signal as compared to other responding access points for the first ESS, and selecting the second access point from the second list based on the second access point having a strongest communication signal as compared to other responding access points for the second ESS.

12. The method of claim 7, comprising:
sending the respective one or more GAS request messages to the first and second access points using a message format in compliance with an access network query protocol (ANQP);
receiving respective one or more GAS response messages from the first and second access points, the respective one or more GAS response messages also in compliance with the ANQP message format;
determining whether to connect to the first network or the second network based on information included in the respective one or more GAS response messages; and
sending an association request based on the determination to an access point from the first list of access points belonging to the first ESS or the second list of access points belonging to the second ESS, the association request to initiate connection to the first network or the second network via the access point.

13. At least one non-transitory machine readable medium comprising a plurality of instructions that in response to being executed cause a system to:
scan, at a mobile device, for access points belonging to two or more extended service sets (ESSs), each of the ESSs belonging to at least one of two or more networks, each of the two or more networks having at least one advertisement server, and each advertisement server capable of separately providing a generic advertisement service (GAS) to the mobile device;
build a first list of access points belonging to a first ESS from among the two or more ESSs based on the scan, the first ESS belonging to a first network having a first advertisement server;

select a first access point from the first list to use the first access point to relay messages related to a first GAS provided by the first advertisement server to the mobile device;

build a second list of access points belonging to a second ESS from among the two or more ESSs based on the scan, the second ESS belonging to a second network having a second advertisement server;

select a second access point from the second list to use the second access point to relay messages related to a second GAS provided by the second advertisement server to the mobile device;

send one or more GAS request messages only to the first access point based on the selection of the first access point, the first access point to relay the respective one or more GAS request messages to the first advertisement server; and send one or more GAS request messages only to the second access point based on the selection of the second access point, the second access point to relay the respective one or more GAS request messages to the second advertisement server.

14. The at least one non-transitory machine readable medium of claim 13, to scan comprising the instructions to cause the system to:

send probe request messages to the access points belonging to the two or more ESSs;

receive separate beacon or probe responses from at least some of the access points belonging to the first and second ESSs, each received beacon or probe response to include an identifier for a respective responding access point, an identifier for a respective ESS, and an indication of whether an advertisement server for the respective ESS will provide a response to a GAS request message from the mobile device that is independent of what access point included in the respective ESS the mobile device selects to use to relay GAS messages between the advertisement server for the respective ESS; and build the first and second lists based on information included in the separate beacon or probe responses.

15. The at least one non-transitory machine readable medium of claim 14, the mobile device and the access points belonging to the two or more ESSs capable of operating in compliance with at least one or more wireless communication standards or specifications associated with the Institute of Electrical and Electronic Engineers (IEEE) 802.11 standards to include IEEE 802.11u or associated with the Hotspot 2.0 Technical Specification.

16. The at least one non-transitory machine readable medium of claim 15, the identifier for the respective responding access point including a basic service set identification (BSSID), the identifier for the respective ESS including a homogeneous ESS identifier (HESSID), and the indication of whether an advertisement server for the respective ESS will provide GAS response messages to the mobile device that are independent of what access point included in the respective ESS the mobile device selects is indicated by a pre-association message exchange BSSID independent (PAME-BI) bit included in the beacon or probe response message sent by the respective responding access point.

17. The at least one non-transitory machine readable medium of claim 15, comprising the instructions to also cause the system to:

send the respective one or more GAS request messages to the first and second access points using a message format in compliance with an access network query protocol (ANQP);

receive respective one or more GAS response messages from the first and second access points, the respective one or more GAS response messages also in compliance with the ANQP message format;

determine whether to connect to the first or second network based on information included in the respective one or more GAS response messages; and send an association request based on the determination to any one of the access points from the first list of access points belonging to the first ESS or any one of the access points from the second list of access points belonging to the second ESS, the association request to initiate connection to the first or second network through the access point.

* * * * *